United States Patent
Aoki

(10) Patent No.: US 9,114,747 B2
(45) Date of Patent: Aug. 25, 2015

(54) HEATING SYSTEM

(75) Inventor: Hiroshi Aoki, Tokyo (JP)

(73) Assignee: Takata Corporation, Tokyo (JP)

( * ) Notice: Subject to any disclaimer, the term of this patent is extended or adjusted under 35 U.S.C. 154(b) by 167 days.

(21) Appl. No.: 13/814,472

(22) PCT Filed: Jul. 27, 2011

(86) PCT No.: PCT/JP2011/067167
§ 371 (c)(1),
(2), (4) Date: Feb. 5, 2013

(87) PCT Pub. No.: WO2012/017900
PCT Pub. Date: Feb. 9, 2012

(65) Prior Publication Data
US 2013/0127211 A1    May 23, 2013

(30) Foreign Application Priority Data
Aug. 5, 2010 (JP) ................................ 2010-176821

(51) Int. Cl.
 *B60N 2/56* (2006.01)
 *B60N 2/00* (2006.01)
(52) U.S. Cl.
 CPC .............. B60N 2/5678 (2013.01); B60N 2/002 (2013.01); B60N 2/5685 (2013.01)
(58) Field of Classification Search
 CPC .... B60N 2/5685; B60N 2/002; B60N 2/5678; A47C 7/748; H05B 2203/029
 USPC ................... 297/180.1, 180.12, 217.2, 217.3; 219/202, 217
 See application file for complete search history.

(56) References Cited

U.S. PATENT DOCUMENTS

| | | | | |
|---|---|---|---|---|
| 5,525,843 A | * | 6/1996 | Howing | ........................ 307/9.1 |
| 7,500,536 B2 | * | 3/2009 | Bulgajewski et al. | ........ 180/273 |
| 7,688,204 B2 | * | 3/2010 | Yamanaka et al. | ............ 340/562 |
| 2001/0045733 A1 | * | 11/2001 | Stanley et al. | ................ 280/735 |
| 2008/0017625 A1 | * | 1/2008 | Ito et al. | ........................ 219/202 |
| 2009/0295199 A1 | * | 12/2009 | Kincaid et al. | ........... 297/180.12 |

FOREIGN PATENT DOCUMENTS

| | | |
|---|---|---|
| DE | 10311132 A1 | 9/2004 |
| JP | 10-199661 A | 7/1998 |
| JP | 2003-231411 A | 8/2003 |
| JP | 2004-504082 A | 2/2004 |
| JP | 2005-172839 A | 6/2005 |

(Continued)

OTHER PUBLICATIONS

International Search Report from the International Bureau of WIPO for International Application No. PCT/JP2011/067167 dated Oct. 25, 2011 and English translation of the same (4 pages).

*Primary Examiner* — Milton Nelson, Jr.
(74) *Attorney, Agent, or Firm* — Fitch Even Tabin & Flannery LLP

(57) ABSTRACT

The heating elements of a seat heater are used to warm the occupant seated on the seat and also used to detect the occupant. The configuration eliminates the need to dispose, in the vicinity of the seating surface of the seat, both a heater unit used for warming the occupant and a sensor for detecting the occupant. As a result, the structure of the seat is simplified to prevent deterioration in seating comfort, and at the same time, the occupant can be accurately detected and the heating elements can be efficiently utilized.

17 Claims, 9 Drawing Sheets

(56) References Cited

FOREIGN PATENT DOCUMENTS

| | | |
|---|---|---|
| JP | 2008-024087 A | 2/2008 |
| JP | 2008-140680 A | 6/2008 |
| JP | 2008-191110 A | 8/2008 |
| JP | 2010-070086 A | 4/2010 |
| JP | 2010-073530 A | 4/2010 |
| WO | 02/06083 A1 | 1/2002 |
| WO | 2009/095340 A1 | 8/2009 |

* cited by examiner

HEATING SYSTEM

CROSS-REFERENCE TO RELATED APPLICATIONS

This application is a U.S. national phase application filed under 35 U.S.C. §371 of International Application PCT/JP2011/067167, filed on Jul. 27, 2011, designating the United States, which claims priority from Japanese Application 2010-176821, filed Aug. 5, 2010, which are hereby incorporated herein by reference in their entirety.

FIELD OF THE INVENTION

The present invention relates to a heating system, and more particularly, to a heating system for warming an occupant seated on a seat.

BACKGROUND OF THE INVENTION

Occupant restraining systems represented by seat belts and air-bag systems have become smaller and of lower cost, and are nowadays installed in almost all kinds of vehicles as standard equipment. This kind of occupant restraining system should be able to detect the occupant of a seat with accuracy for urging him/her to wear the seat belt or for controlling the air-bag according to the presence/absence of the occupant.

On the other hand, vehicles used in cold climates sometimes have a heating element installed in the seats for warming the occupants. The seats of vehicles generally have a seating surface made of a low heat conductive material such as urethane foam. Therefore, for warming the occupant efficiently, the heating element should be placed near the seating surface.

Then, a two-tier structure unit formed by laminating a heating element film and a sensor film has been proposed (for example, see Japanese National Patent Publication No. 2004-504082). Using this unit, a sensor for detecting the occupant and a heating element for warming the occupant can be placed near the seating surface. Consequently, it is possible to warm the occupant seated on the seat efficiently and detect the occupant with accuracy.

SUMMARY OF THE INVENTION

However, with the above unit, both the heating element and the sensor are placed near the seating surface. Therefore, use of the above unit may inconveniently cause the seat to be uncomfortable to sit in.

A possible solution to eliminate this inconvenience is to provide a sensor electrode for detecting the presence/absence of an occupant and a wire of heating element on a common film in the manner that they do not overlap with each other. However, a relatively large current flows through the heating element. Therefore, some noise may intrude into the electric circuit sensing the occupant when a current starts or stops flowing through the heating element.

In consideration of the foregoing, it is an objective of the present invention to efficiently use the heating element and accurately detect the occupant while improving the comfort of the seat.

In order to achieve the above objective, a heating system according to a first aspect of the present invention is:

a heating system for warming an occupant seated on a seat of a vehicle, the heating system comprising:
a heating element disposed in the seat;
a heater unit for passing electricity to the heating element via electrodes connected to the heating element, causing heat to be generated from the heating element;
measurement means for measuring impedance between the electrodes and the vehicle;
detection means for detecting the occupant seated on the seat based on the impedance measured by the measurement means; and
switching means for alternately connecting the heater unit and the measurement means to the electrodes.

A heating system according to a second aspect of the present invention is:

a heating system for warming an occupant seated on a seat of a vehicle, the heating system comprising:
a heating element disposed in the seat;
a heater unit for passing electricity to the heating element via a first electrode and a second electrode connected to the heating element, causing heat to be generated from the heating element;
measurement means for measuring impedance between the first electrode and the vehicle, and impedance between the second electrode and the vehicle;
detection means for detecting the occupant seated on the seat based on the impedance measured by the measurement means; and
switching means for alternately connecting the heater unit and the measurement means to the first electrode and the second electrode.

The measurement means may measure, as an impedance-correlated value, the capacitance between the electrodes and the vehicle from the electric current or voltage input to the electrodes, in concert with changes in the impedance and AC voltage applied between the electrodes and the vehicle.

The measurement means may measure the quadrature component of the electric current with respect to the AC voltage as the capacitance as an impedance-correlated value.

The measurement means may measure the in-phase component of the electric current with respect to the AC voltage; and
the detection means may detect the occupant seated on the seat from a comparison result of the capacitance and a threshold value set from a relationship between the in-phase component and the quadrature component.

The heating system may further comprise temperature detection means for detecting the temperature of the seat near the heating element based on the resistance of the heating element;
wherein the detection means detects the occupant based on the comparison result of the capacitance and the threshold value, and the temperature of the seat detected by the temperature detection means.

The heating system may further comprise a temperature detection sensor for detecting the temperature of the seat near the heating element;
wherein the detection means detects the occupant based on the comparison result of the capacitance and the threshold value, and the temperature of the seat detected by the temperature detection sensor.

The measurement means may measure the in-phase component of the electric current relative to the AC voltage; and
the heater unit may pass electricity to the heating element when the ratio of the in-phase component is at least a threshold value.

The heating system may further comprise abnormality detection means for detecting abnormalities in the heating elements based on the phase difference between the phase of the electric current of the first electrode relative to the voltage applied on the first electrode and the phase of the electric current of the second electrode relative to the voltage applied on the second electrode.

The heater unit may pass electricity to the heating element when the occupant has been detected based on a detection result of the detection means.

According to the present invention, it is possible to use a heating element to warm an occupant seated on a seat and also as a sensor for detecting the occupant. Consequently, the structure of the unit positioned near the surface of the seat is simplified. Through this, it becomes possible to accurately detect an occupant and to efficiently use the heating element while maintaining the comfort of the seat.

DETAILED DESCRIPTION OF THE PREFERRED EMBODIMENTS

Figure 1:
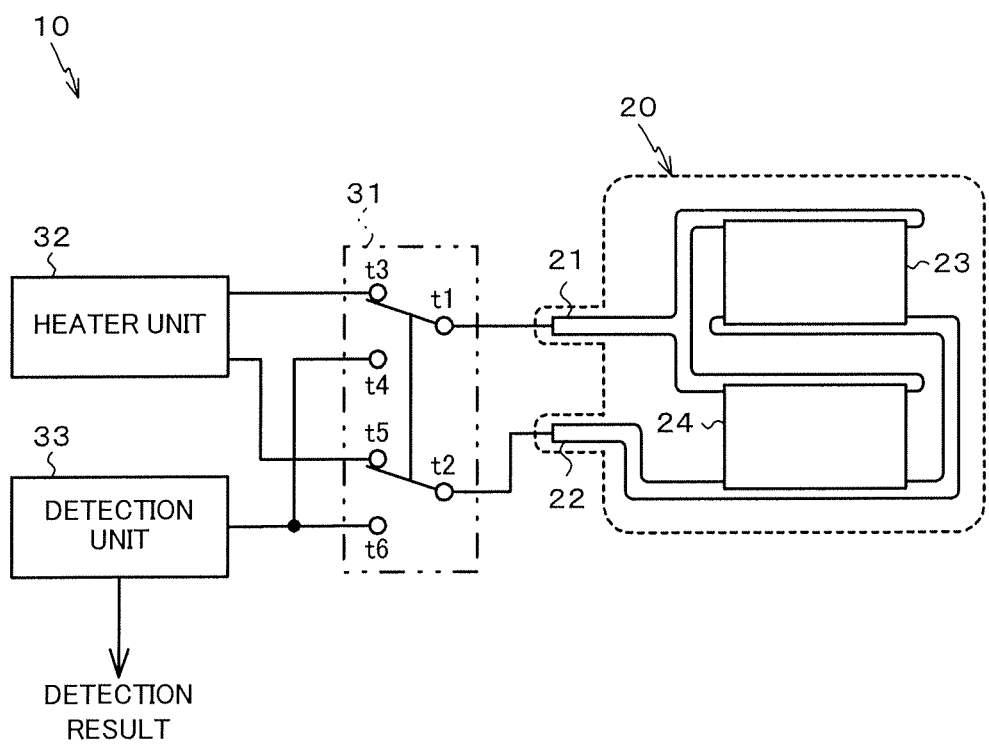
FIG. 1 is a block diagram of a heating system according to a preferred embodiment.

Embodiment of the present invention will be described hereafter with reference to the drawings. FIG. 1 is a block diagram of a heating system 10 according to the preferred embodiment. The heating system 10 is, for example, a system for warming an occupant seated on a seat of a vehicle. As shown in FIG. 1, the heating system 10 has a seat heater 20, a changeover switch 31, a heater unit 32 and a detection unit 33.

Figure 2:
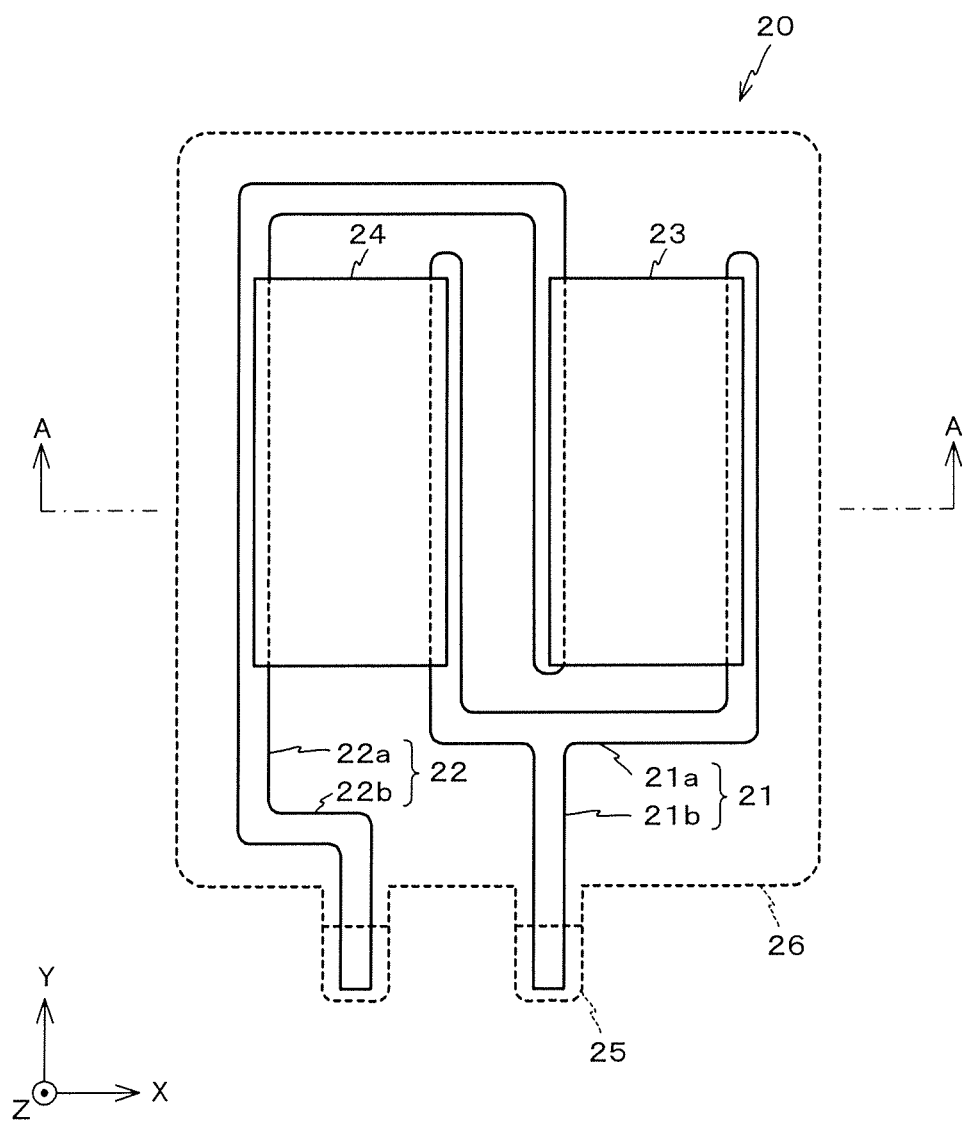
FIG. 2 is a planar view showing a seat heater.
Figure 3:
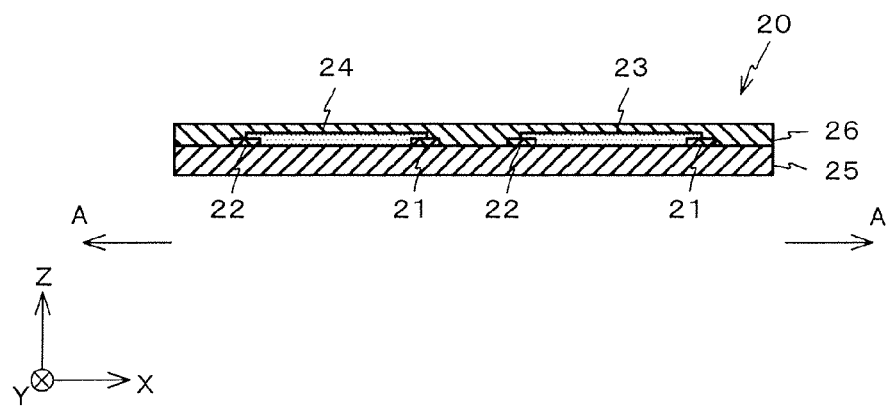
FIG. 3 is a cross-sectional view of the seat heater at a line A-A in FIG. 2.

FIG. 2 is a planar view showing the seat heater 20. In addition, FIG. 3 is a cross-sectional view of the seat heater at a line A-A in FIG. 2. As shown in FIGS. 2 and 3, the seat heater 20 has a first electrode 21, a second electrode 22, heating elements 23 and 24, and insulation sheets 25 and 26 covering the above-described first electrode 21, second electrode 22 and heating elements 23 and 24.

The insulation sheet 25 is, for example, a sheet formed of a PET (polyethylene tephthalate), or a Mylar film. Moreover, the insulation sheet 25 which is a sheet formed of a material with flexibility like polyimide, polyvinyl chloride, or a silicon rubber can be applied. This insulation sheet 25 is shaped into a rectangle having a lengthwise direction in a Y-axis direction.

The first electrode 21 is formed on the top surface (the surface on the +Z side) of the insulation sheet 25. The first electrode 21 is made of a silver paste or copper, and is composed of wiring 21a patterned in a U-shape, and a terminal 21b extending in the −y direction from the wiring 21a.

Similar to the first electrode 21, the second electrode 22 is composed of wiring 22a formed in a U-shape, and an L-shaped terminal 22b connected to the wiring 22a. The part of the wiring 22a comprising the second electrode 22 on the +x side encloses the wiring 21a of the first electrode 21.

The first electrode 21 and the second electrode 22 can be formed by coating and hardening silver paste on the top surface of the insulation sheet 25, or can be formed by adhering copper foil to the insulation sheet 25 and then etching and patterning the copper foil.

The heating elements 23 and 24 are each shaped into a rectangular shape with the lengthwise direction being in the Y-axis direction. These heating elements 23 and 24 are positioned so as to be adjacent in the X-axis direction. As shown in FIG. 3, the heating elements 23 and 24 are each formed from the top surface of the first electrode to the top surface of the second electrode 22.

These heating elements 23 and 24 are formed on the top surface of the insulation sheet 25 by coating and hardening temperature-sensitive resistor paste or carbon paste from the first electrode 21 to the second electrode 22 on the top surface of the insulation sheet 25 on which the first electrode 21 and the second electrode 22 are formed. With temperature-sensitive resistor paste, the resistance value changes depending on the temperature of the paste itself. Consequently, when temperature-sensitive resistor paste is used as the material of the first electrode 21 and the second electrode 22, the electric current flowing through the first electrode 21 and the second electrode 22 is self-regulated by the temperature-sensitive resistor paste.

The insulation sheet 26 is a sheet made of the same kind of material as the insulation sheet 25. The insulation sheet 26 is shaped into the same shape as the insulation sheet 25, and is fastened with an adhesive and/or the like to the top surface of the insulation sheet 25. Through this, the first electrode 21 and the second electrode 22 formed on the top surface of the insulation sheet 25, and the heating elements 23 and 24, are covered.

Figure 4:
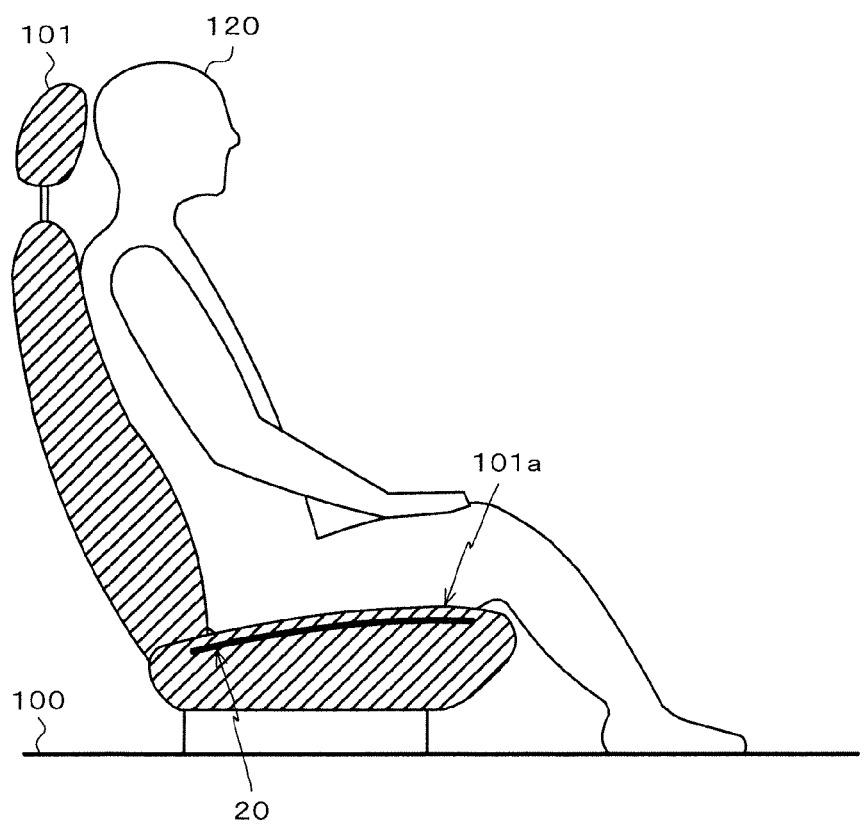
FIG. 4 is an illustration showing a vehicle seat and the occupant seated on the seat.

FIG. 4 is an illustration showing a seat 101 of a vehicle along with an occupant 120 seated on the seat 101. As shown in FIG. 4, the seat heater 20 comprised as described above is positioned directly below the seat cover comprising the seating surface 101a of the seat 101.

Returning to FIG. 1, the changeover switch 31 is a switch that alternately connects the seat heater 20 to the heater unit 32 and the detection unit 33. The changeover switch 31 has six terminals t1 to t6. Furthermore, the terminal t1 is connected to the first electrode 21 of the seat heater 20 and the terminal t2 is connected to the second electrode 22. In addition, the terminal t3 and the terminal t5 are connected to the heater unit 32, and the terminal t4 and the terminal t6 are connected to the detection unit 33.

The changeover switch 31 repeats the action of connecting the terminal t1 to the terminal t3 and the terminal t2 to the terminal t5, and the action of connecting the terminal t1 to the terminal t4 and the terminal t2 to the terminal t6, with a preset period. Through this, the seat heater 20 is alternately connected to the heater unit 32 and the detection unit 33.

The heater unit 32, while connected to the seat heater 20, supplies the seat heater 20 with electrical energy from an unrepresented battery provided in the vehicle. Through this, an electric current flows through the heating elements 23 and 24 of the seat heater 20, and the heating elements 23 and 24 emit heat.

The detection unit 33, while connected to the seat heater 20, finds the AC impedance between the first electrode 21 and second electrode 22 and the vehicle, and determines whether or not the occupant 120 is seated on the seat 101 based on the AC impedance found. Furthermore, the detection unit 33 outputs the result determined to an external device, for example.

Figure 5:
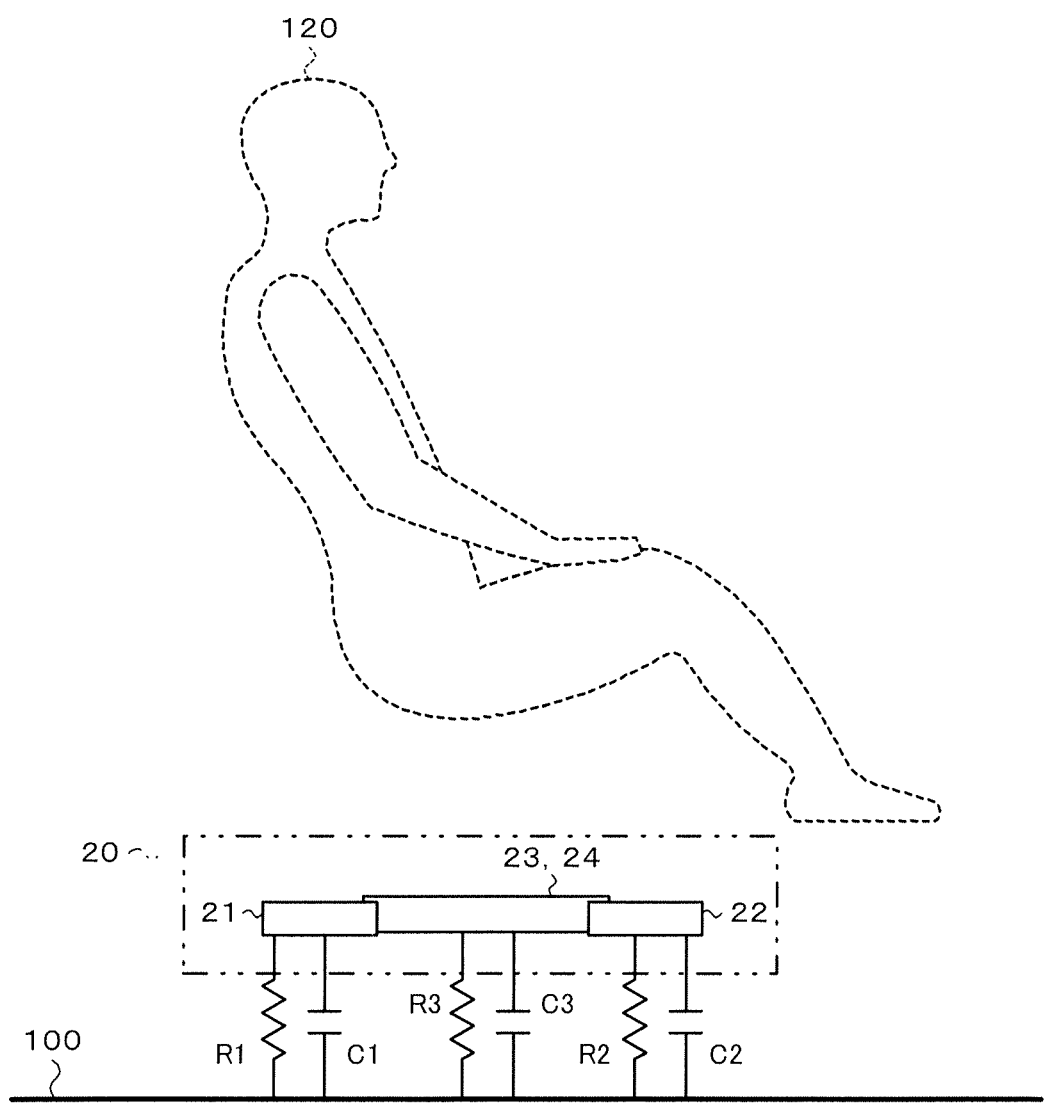
FIG. 5 is a diagram schematically showing the electric circuit formed when there is no occupant seated on the seat.

FIG. 5 is a diagram schematically showing the electric circuit formed when the occupant 120 is seated on the seat 101. In the electrical circuit formed when the occupant is not seated on the seat 101, the first electrode 21 and the body 100 are connected by an AC resistor R1 and a capacitor C1, as shown in FIG. 5. In addition, the second electrode 22 and the body 100 are connected by an AC resistor R2 and a capacitor C2. In addition, the heating elements 23 and 24 are connected by an AC resistor R3 and a capacitor C3.

Figure 6:
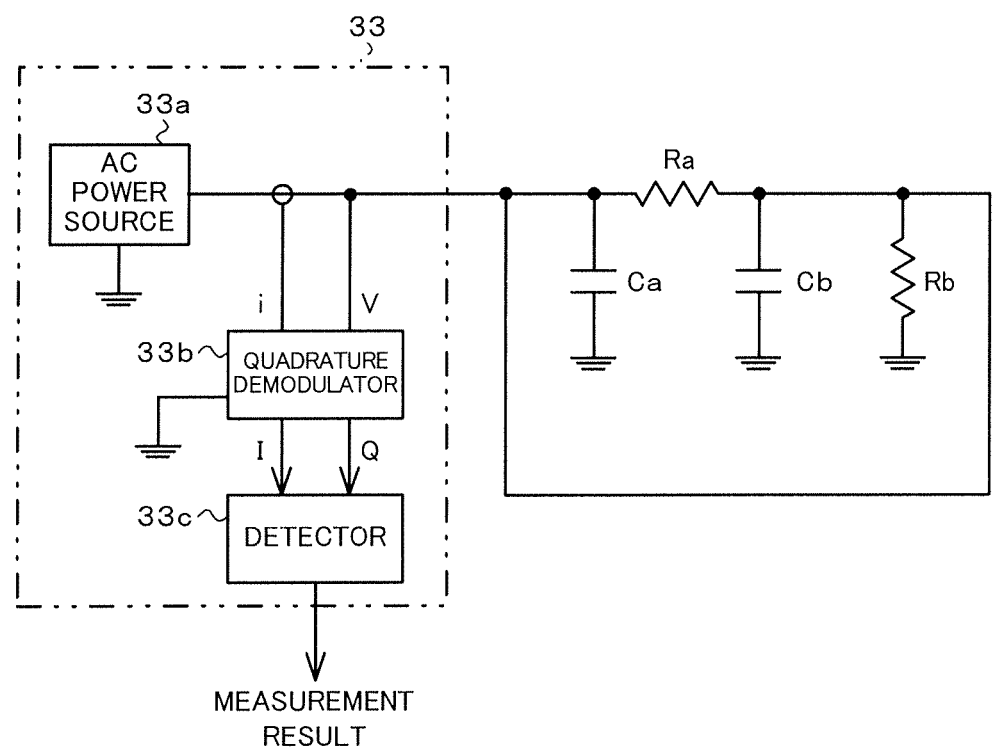
FIG. 6 is a diagram showing an equivalent circuit to the electric circuit in FIG. 5.

FIG. 6 is an equivalent circuit to the circuit shown in FIG. 5. The circuit shown in FIG. 5 can be replaced by the equivalent circuit shown in FIG. 6. A resistor Ra comprising the equivalent circuit in FIG. 6 shows the resistance between the first electrode 21 and the second electrode 22. Furthermore, a resistor Rb is a combined resistance of resistors R1 to R3. The resistance value of resistors R1 to R3 is determined by the seat materials and is remarkably large. Consequently, the resistance value of the resistor Rb that is a combined resistance of the resistors R1 to R3 becomes remarkably larger than the resistance value of the resistor Ra. In addition, the capacitor Ca and the capacitor Cb comprising the equivalent circuit of FIG. 6 are a composite of the capacitors C1 to C3.

As can be seen by referring to the equivalent circuit of FIG. 6, the composite capacitance $C_{T1}$ between the seat heater 20 and the body 100 can be measured from formula (1) below. In formula (1) below, Ca and Cb mean the capacitance of the capacitors Ca and Cb.

$$C_{T1}=Ca+Cb \tag{1}$$

Figure 7:
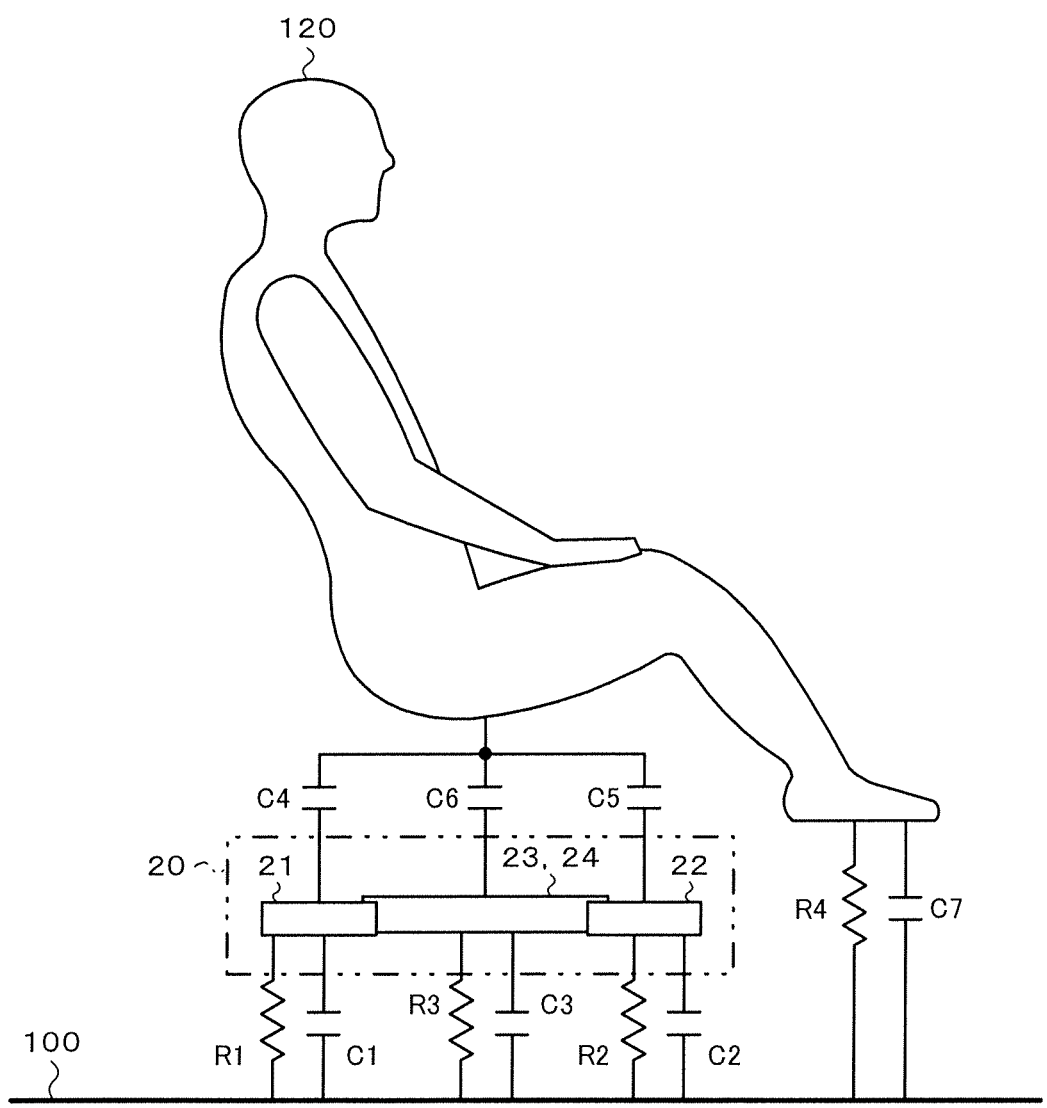
FIG. 7 is a diagram schematically showing the electric circuit formed when there is an occupant seated on the seat.

FIG. 7 is a diagram schematically showing an electrical circuit formed when the occupant 120 is seated on the seat 101. As can be understood by comparing FIG. 7 and FIG. 5, when the occupant 120 is seated on the seat 101, a new circuit interposed by the occupant 120 is formed. This newly formed circuit comprises a capacitor C4 showing the capacitance between the first electrode 21 and the occupant 120, a capacitor C5 showing the capacitance between the second electrode 22 and the occupant 120, a capacitor C6 showing the capacitance between the heating elements 23 and 24 and the occupant 120, a capacitor C7 showing the capacitance between the occupant 120 and the body 100, and a resistor R4 showing the resistance between the occupant 120 and the body 100.

Figure 8:
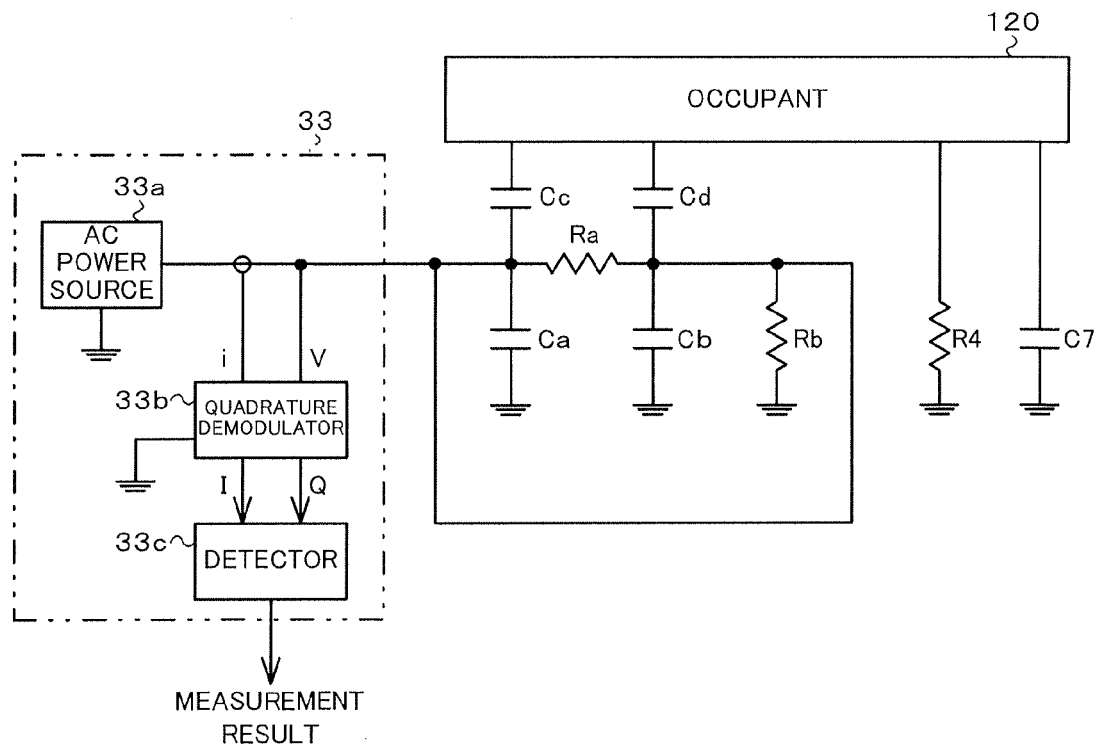
FIG. 8 is a diagram showing an equivalent circuit to the circuit in FIG. 7.

FIG. 8 is an equivalent circuit to the circuit shown in FIG. 7. The circuit shown in FIG. 7 can be replaced by the equivalent circuit shown in FIG. 8. A capacitor Cc and a capacitor Cd comprising the equivalent circuit of FIG. 8 are composites of capacitors C4 to C6.

As can be seen by referencing the equivalent circuit of FIG. 8, when the occupant 120 is seated on the seat 101, the composite capacitance $C_{T2}$ between the seat heater 20 and the body 10 can be measured from formula (2) below. In formula (2) below, Cc, Cd and C7 mean the capacitance of the capacitors Cc, Cd and C7.

$$C_{T2}=C_{T1}+(Cc+Cd)\cdot C7/(Cc+Cd+C7) \tag{2}$$

As can be seen from formula (2), when the occupant 120 is seated on the seat 101, the value of the composite capacitance increases by the amount of the capacitance from the capacitors Cc, Cd and C7. The detection unit 33 detects the composite capacitance that changes as described above, and based on the detected result determines whether or not the occupant 120 is seated on the seat 101. The specific composition of the detector is described below.

For example, as shown in FIG. 8 the detection unit 33 has an AC power source 33a, a quadrature demodulator 33b and a detector 33c.

The AC power source 33a converts the voltage of the unrepresented battery provided in the vehicle into an AC voltage of around 100 kHz, and applies such on the first electrode 21 and the second electrode 22 and on the body 100.

The quadrature demodulator 33b monitors the voltage V between the first electrode 21 and the second electrode 22 and the body 100, and the electric current i supplied to the first electrode 21 and the second electrode 22. Furthermore, the quadrature demodulator 33b outputs to the detector 33c information relating to the in-phase component I of the electric current i relative to the voltage V, and the quadrature component Q of the electric current i relative to the voltage V.

The detector 33c determines whether or not the occupant 120 is seated on the seat 101 based on the value of the in-phase component I and the quadrature component Q. Furthermore, the detector 33c outputs the result determined to an external device and/or the like, for example.

Figure 9:
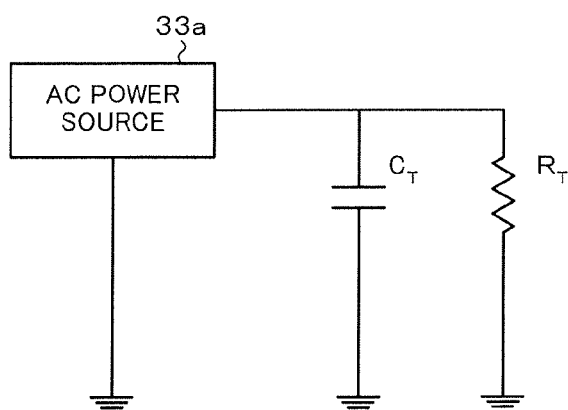
FIG. 9 is a diagram showing an equivalent circuit between an electrode and body.

The electric circuits shown in FIGS. 6 and 8 as one example can be considered as the circuit shown in FIG. 9. In this case, the impedance between the first electrode 21 and second electrode 22 and the body 100, that is to say, the composite resistance $R_T$ and the composite capacitance $C_T$, are respectively shown by formula (3) and formula (4) below. With formula (3) below, the composite capacitance $C_T$ can be seen to be equivalent to the quadrature component Q.

$$C_T=Q \tag{3}$$

$$R_T=1/I \tag{4}$$

Hence, the detector 33c compares, for example, the value of the quadrature component Q with a predetermined threshold value. Next, when the quadrature component Q is equal to or larger than the threshold value, the detector 33c determines that the occupant 120 is seated on the seat 101. Conversely, when the quadrature component Q is smaller than the predetermined threshold value, the detector 33c determines that no occupant 120 is seated on the seat 101.

According to the present embodiment, when the seating surface 101a of the seat 101 is wet or when the material of the seat 101 is moist, the above-explained threshold is set in consideration of the increase of the capacitance between the sensor electrode 25 and the vehicle 100. To set such a threshold, a straight line indicating an IQ characteristic shown in FIG. 10 is utilized.

Figure 10:
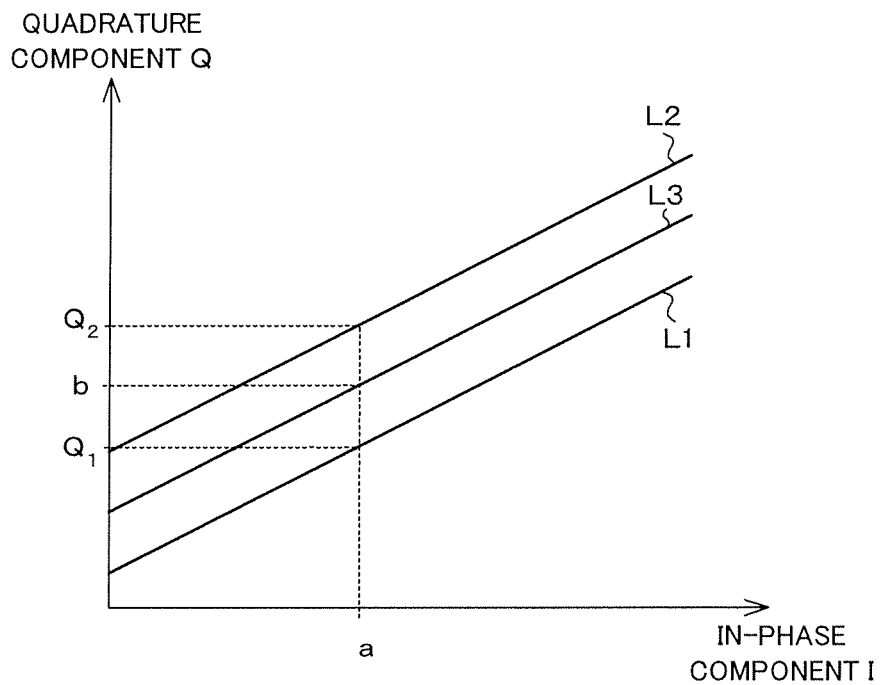
FIG. 10 is a graphical representation showing a relationship between the quadrature component and the in-phase component.

A straight line L1 in FIG. 10 shows a relationship between the quadrature component Q and the in-phase component I when the occupant 120 is not seated on the seat 101. In addition, a straight line L2 shows the relationship between the quadrature component Q and the in-phase component I when the occupant 120 is seated on the seat 101. The detector 33c determines the threshold value based on a straight line L3 between the straight line L1 and the straight line L2. For example, when the value of the in-phase component I is a, the detector 33c determines the threshold value to be b. Furthermore, when the value of the quadrature component Q is a value larger than the threshold value b, for example $Q_2$, the detector 33c determines that the occupant 120 is seated on the seat 101. On the other hand, when the value of the quadrature component Q is a value smaller than the threshold value b, for example $Q_1$, the detector 33c determines that the occupant 120 is not seated on the seat 101. Furthermore, the detector 33c outputs information related to the result of the above-described determination to an external device, for example.

The relationship between the in-phase component I and the quadrature component Q when the passenger is seated differs depending on the shape and material of the seat or the temperature, and is not necessarily expressed by a straight line as shown in FIG. 10. In this case, it is possible to accurately determine the threshold value by making the straight line L3 determining the threshold value a polyline or curve in accordance with polylines or curves showing the relationship between the in-phase component I and the quadrature component Q. In addition, by also revising the threshold value in accordance with temperature, it is possible to accurately determine the threshold value.

The external device can use the determination result, for example, for giving a warning to wear the seatbelt or for controlling the expansion of the air-bag.

As explained above, with this preferred embodiment, the seat heater 20 positioned near the seating surface 101a of the seat 101 is used to warm the occupant 120 seated on the seat 101 and also to detect the occupant 120 seated on the seat 101. Consequently, it is not necessary to position both a heater unit used for warming the occupant 120 and a sensor for detecting the occupant 120 near the seating surface 101a of the seat 101, for example. Accordingly, the composition of the seat 101 does not become complex and the comfort of the seat 101 is not lost.

In addition, the heating elements 23 and 24 of the seat heater 20 of the preferred embodiment are used to warm the occupant 120 and are also used to detect the occupant 120 seated on the seat 101. Consequently, the structure of the seat heater 20 is simplified. Accordingly, it is possible to reduce the cost of the seat heater 20 and consequently it is possible to realize the heating system 10 at low cost.

In addition, with the preferred embodiment both the first electrode 21 and the second electrode 22 are connected to the detection unit 33, as shown in FIG. 1, for example. Consequently, the potentials of the first electrode 21 and the second electrode 22 are the same. Accordingly, even when the resistance of the heating elements 23 and 24 change due to the temperatures of the heating elements 23 and 24 rising, or when the difference between the resistance of the heating element 23 and the resistance of the heating element 24 becomes large, the detection unit 33 can accurately detect the occupant 120 seated on the seat 101 without being influenced by the resistance values of the heating elements 23 and 24.

In addition, with the preferred embodiment the threshold value for determining whether or not the occupant 120 is seated on the seat 101 based on the value of the in-phase component I output from the quadrature demodulator 33b is corrected. Accordingly, it is possible to detect the occupant 120 with good accuracy.

Figure 11:
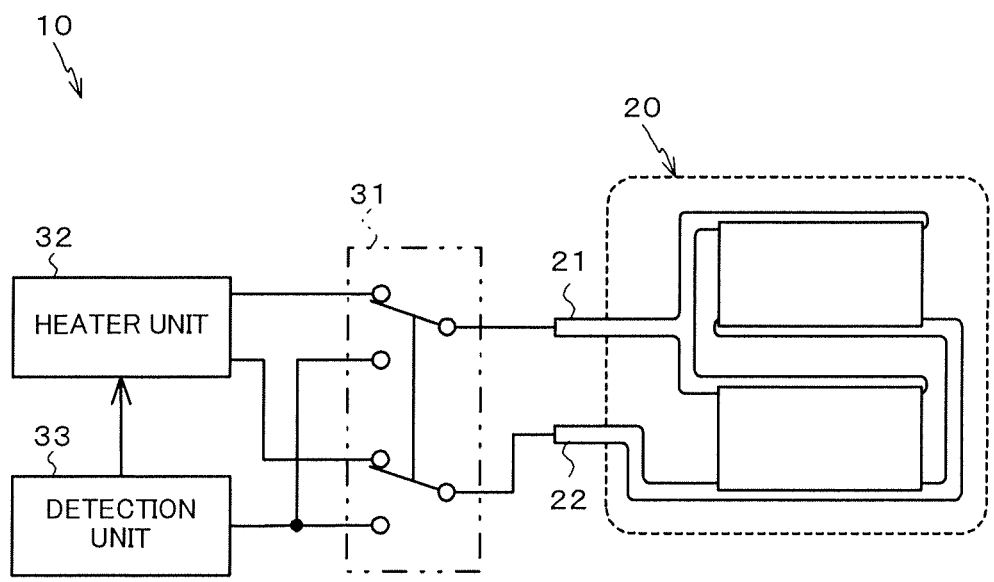
FIG. 11 is a block diagram of a heating system according to a modified embodiment; and, FIG. 12 is a diagram showing the seat heater according to a modified embodiment.

The embodiments of the present invention were explained above, but the present invention is not limited to the above-explained embodiments. For example, according to the above-explained embodiments, information on the determination result by the detection unit 33 is output to the external device. The present invention is not limited to this configuration, and the information on the determination result by the detection unit 33 may be output to the heater unit 32, for example as shown in FIG. 11. This allows the heater unit 32 to stop energizing the heater electrodes 21 and 22 when, for example, no occupant 120 is seated on the seat 101. This suppresses unnecessary power consumption.

Moreover, the heater unit 32 may obtain information on the in-phase component I from the detection unit 33, and may determine that the seat 101 is moistened when the in-phase component I exceeds a threshold to continue energizing the heater electrodes 21 and 22. According to such a configuration, the drying of the seat 101 can be prompted, thereby improving the detection precision of the occupant 120 seated on the seat 101.

Figure 12:
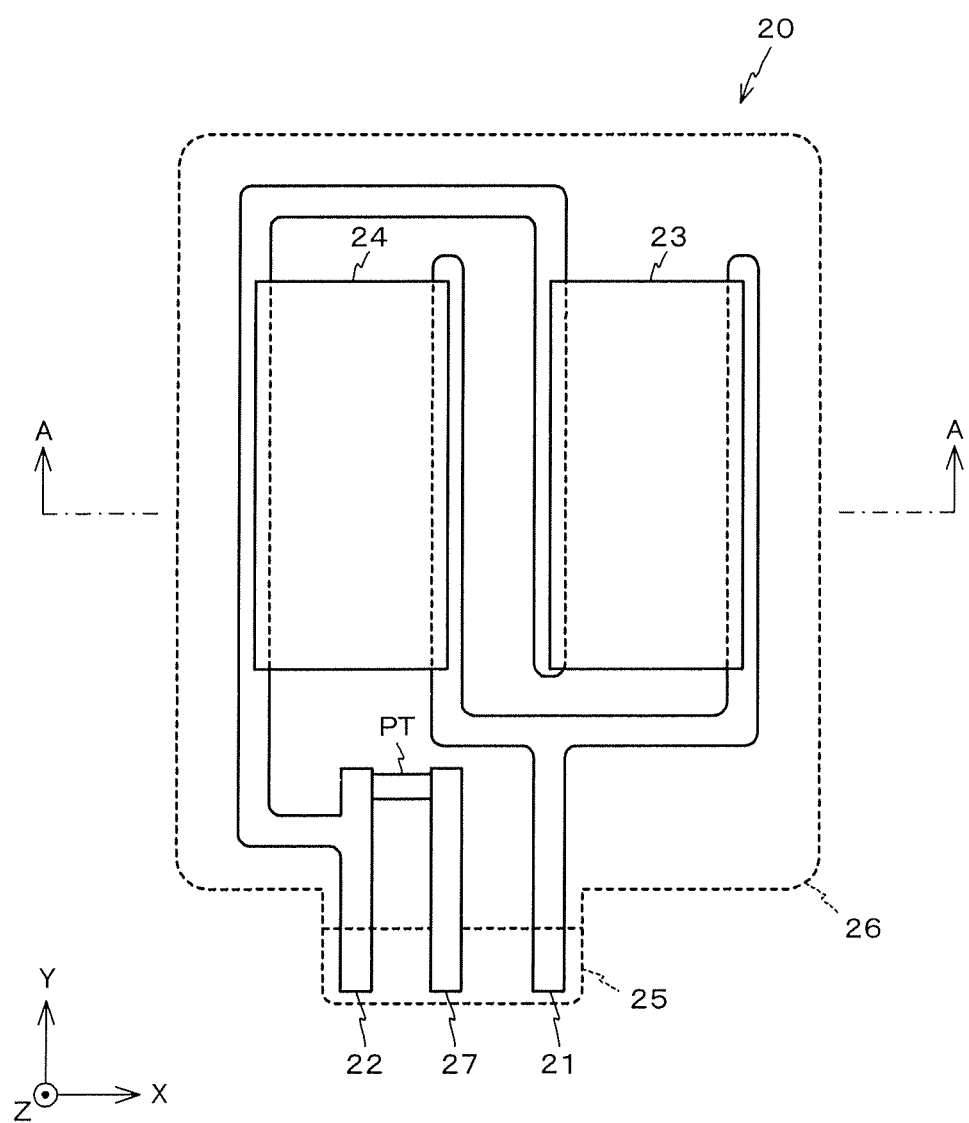

In addition, as shown in FIG. 12, a temperature-sensitive resistor PT for detecting the temperature of the seat 101 may be formed on the top surface of the insulation sheet 25. Through this, the detection unit 33 can detect the temperature of the seat 101 from the resistance of the temperature-sensitive resistor PT found via the second electrode 22 and a third electrode 27, and can correct the threshold value for determining whether or not the occupant 120 is seated on the seat 101 taking the detected temperature into consideration.

In addition, the detection unit 33 may detect the temperature of the seat 101 from the resistance of the heating elements 23 and 24 found via the first electrode 21 and the second electrode 22, and may correct the threshold value for determining whether or not the occupant 120 is seated on the seat 101 taking the detected temperature into consideration.

In addition, the heater unit 32 may accomplish a disconnection diagnosis by finding the resistance values of the heating elements 23 and 24 when electric current is passing, for example. In addition, the detection unit 33 may accomplish a disconnection diagnosis based on the quadrature component Q and the in-phase component I. The resistance values of the heating elements 23 and 24 change depending on the temperature, so a failure diagnosis could be difficult when only finding the resistance values of the heating elements 23 and 24. However, by monitoring changes in the quadrature component Q and the in-phase component I, it is possible to accurately diagnose failures such as disconnection of the seat heater 20.

In addition, with the above-described preferred embodiment, both the first electrode 21 and the second electrode 22 were connected to the detection unit 33, for example as shown in FIG. 1. This is not intended to be limiting, for one out of the first electrode 21 and the second electrode 22 may be connected to the detection unit 33. In this case also, it is possible to detect the occupant 120 seated on the seat 101.

In addition, the first electrode 21 and the second electrode 22 may be alternately connected to the detection unit 33. In this case, it is possible detect abnormalities between the first electrode 21 and the second electrode 22 by comparing the phase of the electric current with respect to the voltage applied on the first electrode 21, and the phase of the electric current with respect to the voltage applied on the second electrode 22. For example, when the phase of the electric current with respect to the voltage applied on the first electrode 21 and the phase of the electric current with respect to the voltage applied on the second electrode 22 differ, it can be considered that there is an abnormality such as a burn-out between the first electrode 21 and the second electrode 22.

As described above, when the seating surface 101a of the seat 101 is wet or when the material comprising the seat 101 is tinged with moisture, the capacitance between the first electrode 21 and second electrode 22 and the body 100 increases. The difference between the phase of the electric current with respect to the voltage applied on the first electrode 21 and the phase of the electric current with respect to the voltage applied on the second electrode 22 may be compared between after the passage of electric current to the heating elements 23 and 24 is accomplished and before the passage of electric current to the heating elements 23 and 24 is accomplished, taking this into consideration.

In addition, with the above-described preferred embodiment the voltage V between the first electrode 21 and second electrode 22 and the body 100 and the electric current i supplied to the first electrode 21 and the second electrode 22 were monitored and detection of the occupant 120 seated on the seat 101 was accomplished based on the in-phase component I of the electric current i with respect to the voltage V and the quadrature component Q of the electric current i with respect to the voltage V. This is not intended to be limiting, for a voltage partitioning method may be used, for example to find the quadrature component Q, and detection of the occupant 120 seated on the seat 101 may be accomplished based on the quadrature component Q.

The detection unit according to the above-explained embodiments may be configured by hardware resources, or may be a computer or a microcomputer configured by a CPU (Central Processing Unit), a main memory, and an auxiliary memory.

Various embodiments and modifications are available to the present invention without departing from the broad sense of spirit and scope of the present invention. The above-described embodiments are given for explaining the present invention and do not confine the scope of the present invention. In other words, the scope of the present invention is set forth by the scope of claims, not by the embodiments. Various modifications made within the scope of claims and scope of significance of the invention equivalent thereto are considered to fall under the scope of the present invention.

The heating system of the present invention is suitable for the detection of the occupant seated on the seat.

The invention claimed is:

1. A heating system for warming an occupant when seated on a seat of a vehicle, the heating system comprising:
a heating element for being disposed in the seat;
a heater unit that passes electricity to the heating element via electrodes connected to the heating element, causing heat to be generated from the heating element;
a measurement unit that measures impedance between the electrodes and the vehicle;
a detection unit that detects the occupant when seated on the seat based on the impedance measured by the measurement unit; and
a switching unit that alternately connects the heater unit and the measurement unit to the electrodes.

2. The heating system according to claim 1, wherein the heater unit passes electricity to the heating element when the occupant has been detected based on a detection result of the detection unit.

3. The heating system according to claim 1, wherein the measurement unit measures, as an impedance-correlated value, a capacitance between the electrodes and the vehicle from the electric current or voltage input to the electrodes, in concert with changes in the impedance and an AC voltage applied between the electrodes and the vehicle.

4. The heating system according to claim 3, wherein the measurement unit measures a quadrature component of the electric current with respect to the AC voltage as the capacitance as an impedance-correlated value.

5. The heating system according to claim 4, wherein:
the measurement unit measures an in-phase component of the electric current with respect to the AC voltage; and
the detection unit detects the occupant when seated on the seat from a comparison result of the capacitance and a threshold value set from a relationship between the in-phase component and the quadrature component.

6. The heating system according to claim 5, further comprising a temperature detection unit that detects the temperature of the seat near the heating element based on resistance of the heating element;
wherein the detection unit detects the occupant based on the comparison result of the capacitance and the threshold value, and the temperature of the seat detected by the temperature detection unit.

7. The heating system according to claim 5, further comprising a temperature detection sensor for detecting the temperature of the seat near the heating element;
wherein the detection unit detects the occupant based on the comparison result of the capacitance and the threshold value, and the temperature of the seat detected by the temperature detection sensor.

8. The heating system according to claim 3, wherein:
the measurement unit measures an in-phase component of the electric current relative to the AC voltage; and
the heater unit passes electricity to the heating element when the ratio of the in-phase component is at least a threshold value.

9. A heating system for warming an occupant when seated on a seat of a vehicle, the heating system comprising:
a heating element for being disposed in the seat;
a heater unit that passes electricity to the heating element via a first electrode and a second electrode connected to the heating element, causing heat to be generated from the heating element;
a measurement unit that measures impedance between the first electrode and the vehicle, and between the second electrode and the vehicle;
a detection unit that detects the occupant when seated on the seat based on the impedance measured by the measurement unit; and
a switching unit that alternately connects the heater unit and the measurement unit to the first electrode and the second electrode.

10. The heating system according to claim 9, further comprising an abnormality detection unit that detects abnormalities in the heating element based on a phase difference between a phase of the electric current of the first electrode relative to the voltage applied on the first electrode and a phase of the electric current of the second electrode relative to the voltage applied on the second electrode.

11. The heating system according to claim 9, wherein the heater unit passes electricity to the heating element when the occupant has been detected based on a detection result of the detection unit.

12. The heating system according to claim 9, wherein the measurement unit measures, as an impedance-correlated value, a capacitance between the electrodes and the vehicle from the electric current or voltage input to the electrodes, in concert with changes in the impedance and an AC voltage applied between the electrodes and the vehicle.

13. The heating system according to claim 12, wherein the measurement unit measures a quadrature component of the electric current with respect to the AC voltage as the capacitance as an impedance-correlated value.

14. The heating system according to claim 13, wherein:
the measurement unit measures an in-phase component of the electric current with respect to the AC voltage; and
the detection unit detects the occupant when seated on the seat from a comparison result of the capacitance and a threshold value set from a relationship between the in-phase component and the quadrature component.

15. The heating system according to claim 14, further comprising a temperature detection unit that detects the temperature of the seat near the heating element based on resistance of the heating element;

wherein the detection unit detects the occupant based on the comparison result of the capacitance and the threshold value, and the temperature of the seat detected by the temperature detection unit.

16. The heating system according to claim 14, further comprising a temperature detection sensor for detecting the temperature of the seat near the heating element;
wherein the detection unit detects the occupant based on the comparison result of the capacitance and the threshold value, and the temperature of the seat detected by the temperature detection sensor.

17. The heating system according to claim 12, wherein:
the measurement unit measures an in-phase component of the electric current relative to the AC voltage; and
the heater unit passes electricity to the heating element when a ratio of the in-phase component is at least a threshold value.

* * * * *